Patented Nov. 9, 1943

2,333,929

UNITED STATES PATENT OFFICE 2,333,929

TERTIARY HEXYL ALCOHOL-FORMALDEHYDE CONDENSATION PRODUCT AND METHOD FOR PREPARING THE SAME

Mortimer T. Harvey, East Orange, N. J., assignor to Harvel Research Corporation, a corporation of New Jersey No Drawing. Original application October 10, 1942, Serial No. 461,597. Divided and this application October 10, 1942, Serial No. 461,599

7 Claims. (Cl. 260—638)

This invention relates to methods of making condensation products of tertiary aliphatic alcohols and formaldehyde and to the products of such methods. The present application is a division of my application Serial No. 461,597 filed October 10, 1942.

Heretofore, it has been proposed to react tertiary aliphatic alcohols with formaldehyde under anhydrous conditions and in the presence of a mineral acid. In Example 6 of the United States patent to Ellis 2,143,870, the patentee describes the treatment under anhydrous conditions of tertiary butyl alcohol with trioxymethylene in the presence of hydrochloric acid, and claims to have obtained di-tertiary-butyl formal.

I have discovered that novel products may be obtained by employing new methods of treating a tertiary alcohol with formaldehyde. According to my novel methods, tertiary hexyl alcohol may be treated with an aqueous solution of formaldehyde in the presence of a mineral acid. By employing these methods, I have found that one mole of tertiary hexyl alcohol will completely react with more than one mole and with as high as about four to seven moles of the formaldehyde in aqueous solution. In the course of my experimentations, I have discovered that when a mixture of tertiary hexyl alcohol and aqueous solution of formaldehyde is heated in the presence of a catalyst such as a mineral acid, the formaldehyde and the alcohol react to produce a product which continues to react with the formaldehyde notwithstanding the presence of unreacted alcohol. This reaction continues until more than one mole of the formaldehyde has completely reacted with one mole of tertiary hexyl alcohol, where the mole ratio of formaldehyde to the alcohol is greater than one and even in those cases where equimolecular proportions of the alcohol and formaldehyde are used and also in those cases where the alcohol and formaldehyde in aqueous solution were present in the ratio as low as two to one. According to this invention, it has been found preferable to employ one to eight moles of formaldehyde in aqueous solution to one part of tertiary hexyl alcohol. When the eight or more moles of formaldehyde in aqueous solution was employed with one mole of tertiary hexyl alcohol, it was found that it was in excess of that which would react with the alcohol and therefore a proportion thereof was present at the end of the reaction period.

The methods of the present invention and the products thereof can be disclosed best by showing how they are produced, for which the following are given as illustrative examples.

*Example 1.*—One mole tertiary hexyl alcohol and one mole of formaldehyde at one hundred pounds pressure. The tertiary hexyl alcohol used in this and the following examples was diethyl methyl carbinol with a boiling point of 123° C.

Tertiary hexyl alcohol_____grams__ About 306
Formaldehyde solution (37½% by
  weight) _____grams__ About 240
Sulphuric acid (conc.)_____cc__ About 3.0 were heated together in an autoclave to 100 pounds per square inch pressure and held there for one hour. The mixture was then cooled to room temperature. No odor of formaldehyde remained. The mixture separated into two layers and was neutralized by the addition of dilute sodium hydroxide. The oil layer, amounting to 329 grams (specific gravity of 0.874 at 25° C.) was distilled to vapor temperature of 135° C. The residue, amounting to 166 grams (specific gravity 0.955) was soluble in alcohol, benzene and gasoline but insoluble in water. A portion of the residue oil distilled at atmospheric pressure gave the following results:

| Per cent distilled | 10 | 20 | 30 | 40 | 50 | 60 | 70 | 80 | 90 |
|---|---|---|---|---|---|---|---|---|---|
| ° C. | 143 | 155 | 167 | 180 | 195 | 213 | 233 | 244 | 276 |

*Example 2.*—One mole of tertiary hexyl alcohol and three moles of formaldehyde at one hunderd pounds pressure.

Tertiary hexyl alcohol_____grams__ About 306
Formaldehyde solution (37½%)_do____ About 720
Sulphuric acid (conc.)_____cc__ About 1.5 were heated in an autoclave to one hundred pounds per square inch pressure and held there for one hour. The mixture was then cooled to room temperature. No odor of formaldehyde remained. The mixture separated into two layers. It was then neutralized by addition of dilute sodium hydroxide and the top oil layer which separated amounted to 405 grams (specific gravity 0.992). This oil layer was then distilled to vapor temperature of 135° C. The residue amounting to 325 grams (specific gravity of 1.030) was soluble in alcohol, benzene and gasoline but insoluble in water. The distillate was also water insoluble. The residue oil, distilled at atmospheric pressure gave the following results:

| Per cent distilled | 10 | 20 | 30 | 40 | 50 | 60 | 70 | 80 | 90 |
|---|---|---|---|---|---|---|---|---|---|
| ° C. | 175 | 194 | 210 | 225 | 242 | 253 | 263 | 280 | 300 |

*Example 3.*—One mole of tertiary hexyl alcohol and eight moles of formaldehyde at one hundred pounds pressure.

Tertiary hexyl alcohol_____grams__ About 153
Formaldehyde solution (37½%)_do___ About 960
Sulphuric acid (conc.)_____cc__About 0.75 were heated in an autoclave to one hundred pounds per square inch pressure and held there for one hour. The mixture was then cooled to room temperature and a slight odor of formaldehyde remained. The bottom oil layer was neutralized by the addition of dilute sodium hydroxide and separated, yielding 248 grams (specific gravity 1.072). This oil layer was then distilled at atmospheric pressure to a vapor temperature of 135° C. The residue was a brown viscous oil weighing 181 grams (specific gravity 1.090 at 25° C.). The distillate to 135° C. was water soluble. The residue oil, distilled at atmospheric pressure gave the following results:

| Per cent distilled | 10 | 20 | 30 | 40 | 50 | 60 | 70 | 80 |
|---|---|---|---|---|---|---|---|---|
| ° C | 234 | 244 | 249 | 254 | 259 | 264 | 278 | 300 |

This residue oil, before distillation, was soluble in alcohol, benzene and gasoline and insoluble in water.

The tertiary hexyl alcohol employed in Examples 1, 2 and 3 may be dimethyl normal propyl carbinol, dimethyl isopropyl carbinol or diethyl methyl carbinol or a combination of two or more of them.

In Examples 1, 2 and 3, the reactions are disclosed as having been carried out at pressure above atmospheric. The same results may be obtained at atmospheric pressure by heating the components thereof to boiling under a reflux condenser for about six hours. The only change in the original constituents is that under atmospheric pressure it is preferable to employ 60, 30 and 15 grams of 50% solution of sulphuric acid respectively in place of the 3, 1.5 and .75 grams of concentrated sulphuric acid.

Although all of the examples presented have utilized sulphuric acid as the mineral acid condensing agent, it has been found that hydrochloric acid can be substituted for the sulphuric acid with no change in either the yield or the properties of the products obtained. There is one exception to this statement. Lighter colored products have resulted from the use of sulphuric acid. The quantity of acid used, it will be noted, varies considerably with the pressure under which the reaction is carried out. At pressures greater than atmospheric pressure much less acid need be used and lighter-colored products are possible.

The most important factor, as regards percentage yield of higher boiling material, as well as specific gravity, is the ratio of formaldehyde to the tertiary alcohol. When the mole ratio of the formaldehyde to the alcohol is as great as about 3 to 1, the yield of the products boiling above 135° C. is greater than 100% of the quantity of the alcohol originally present.

The higher boiling products obtained by the methods of this invention are new materials and of unknown chemical composition. That they are not merely formals is evidenced from a consideration of the properties of the products obtained and also from the observation that larger amounts of formaldehyde than even equal molecular proportions are condensed with the alcohol in the method of this invention.

The specific gravities of the products boiling above 135° C. obtained by the method of this invention are all close to, or greater than one, whereas the formals of alcohols having from four to six carbon atoms which have been described in the literature, all have specific gravities below 0.85. Thus, according to Arnhold in "Annalen der Chemie" vol. 240, page 203 (1887), the formal of isobutyl alcohol has a density of 0.824 and isoamyl alcohol a density of 0.835.

The products boiling above 135° C. obtained in accordance with the methods of the present invention have been found to be solvents for such materials as cellulose nitrate, ethyl cellulose, cellulose acetate, polyvinyl esters and some grades of polyvinyl alcohol.

I claim:

1. The method for producing an organic condensation product being substantially unaffected by hot dilute mineral acid and soluble in ethyl alcohol, comprising heating together from one to eight moles of formaldehyde in aqueous solution and one mole of a tertiary hexyl alcohol in the presence of a mineral acid until such product is formed.

2. The method for making an organic condensation product soluble in ethyl alcohol and being unaffected by hot dilute mineral acid and whose yield is as great as about 100% of the quantity of a tertiary hexyl alcohol originally present, comprising heating until said product is obtained at said yield a tertiary hexyl alcohol and an aqueous solution of formaldehyde in the presence of a mineral acid, the mole ratio of the formaldehyde in said solution to said tertiary hexyl alcohol being as great as about 3 to 1.

3. The method for making an organic condensation product being soluble in ethyl alcohol and being substantially unaffected by dilute mineral acid, which comprises in the presence of a mineral acid completely reacting one mole of a tertiary hexyl alcohol with more than one mole of formaldehyde in aqueous solution.

4. The method of making condensation products, which comprises heating together from one to eight moles of formaldehyde in water solution and one mole of a tertiary hexyl alcohol, in the presence of a mineral acid, and removing therefrom the portion of the condensation products boiling below about 135° C.

5. A product having fractions whose boiling points are above 135° C. and obtained by heating together from one to eight moles of formaldehyde in water solution and one mole of a tertiary hexyl alcohol, in the presence of a mineral acid.

6. A product whose boiling point is above 135° C. and obtained by heating together from one to eight moles of formaldehyde in water solution and one mole of a tertiary hexyl alcohol, in the presence of a mineral acid.

7. A water and gasoline insoluble product having boiling points above 135° C. obtained by heating together from one to eight moles of formaldehyde in water solution and one mole of a tertiary hexyl alcohol, in the presence of a mineral acid.

MORTIMER T. HARVEY.